June 16, 1964 W. L. C. WHEATON 3,137,422
AUTOMOBILE ROOF MOUNTED BICYCLE CARRIER
Filed May 1, 1961 4 Sheets-Sheet 1
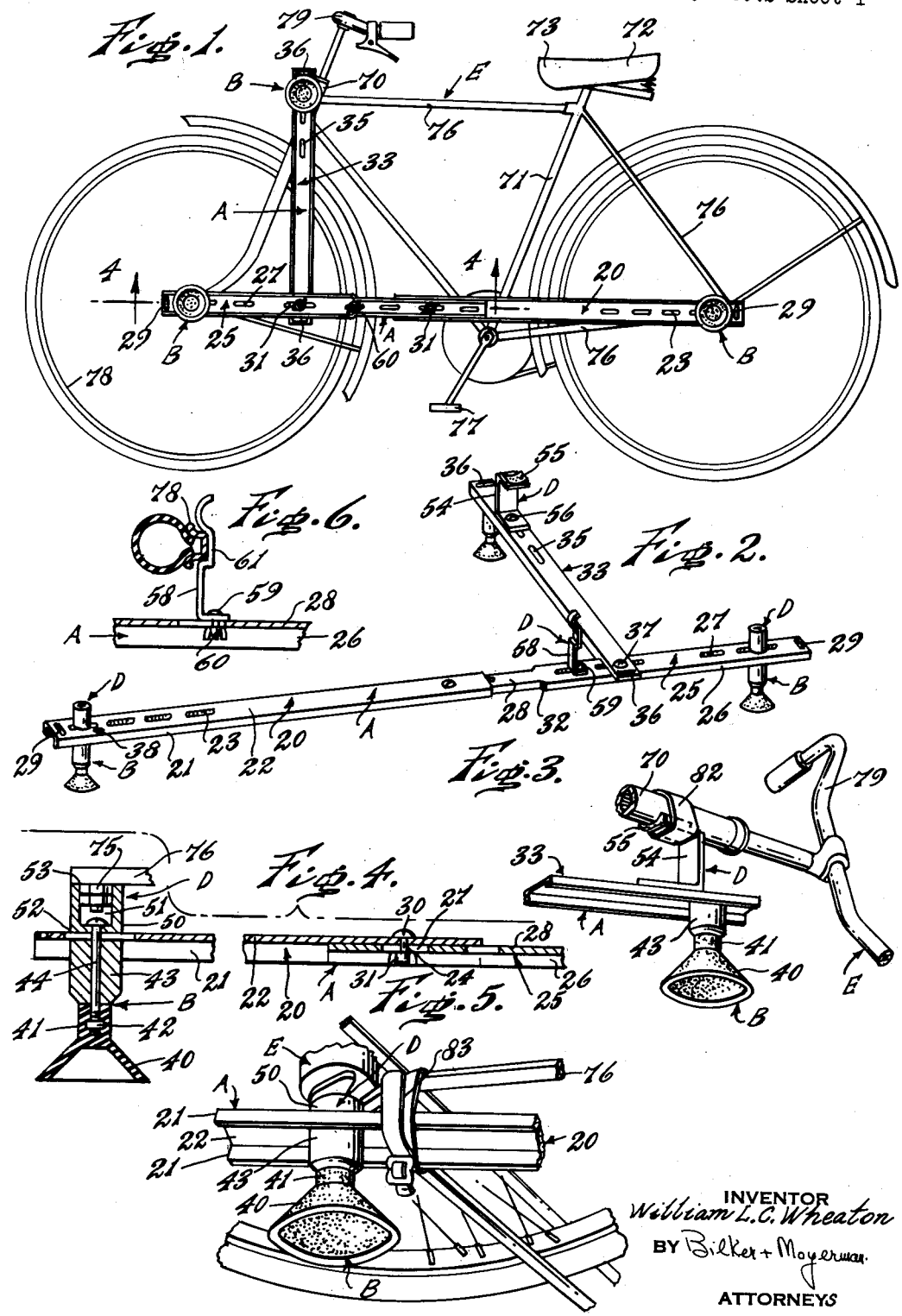
INVENTOR
William L. C. Wheaton
BY Bilker + Moyerman
ATTORNEYS

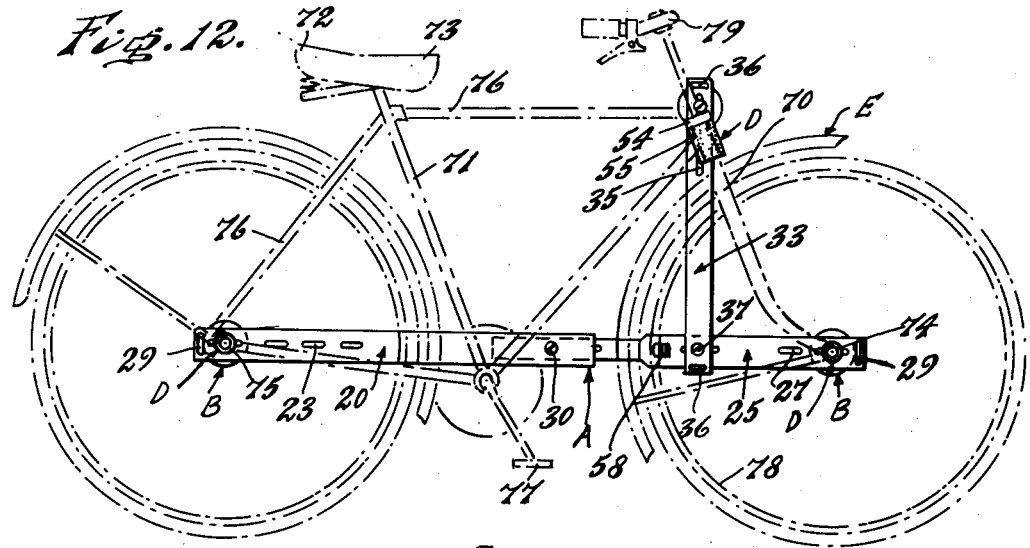
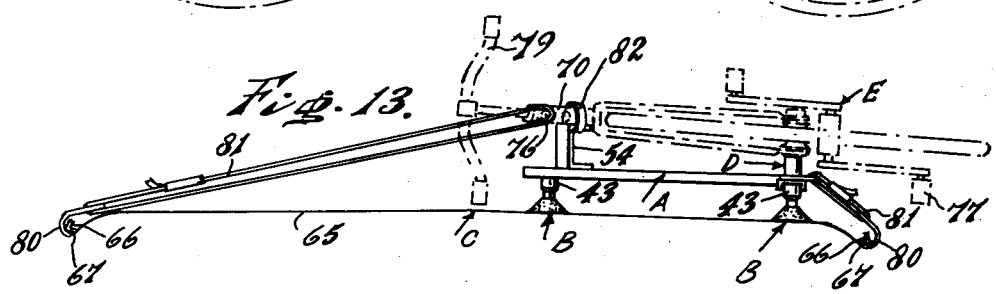
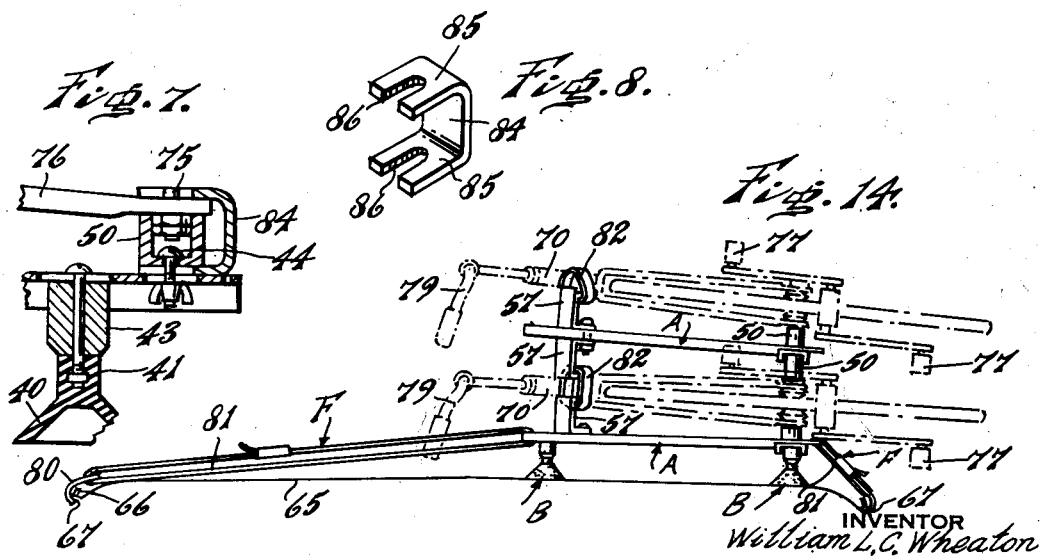

June 16, 1964  W. L. C. WHEATON  3,137,422
AUTOMOBILE ROOF MOUNTED BICYCLE CARRIER
Filed May 1, 1961  4 Sheets-Sheet 3
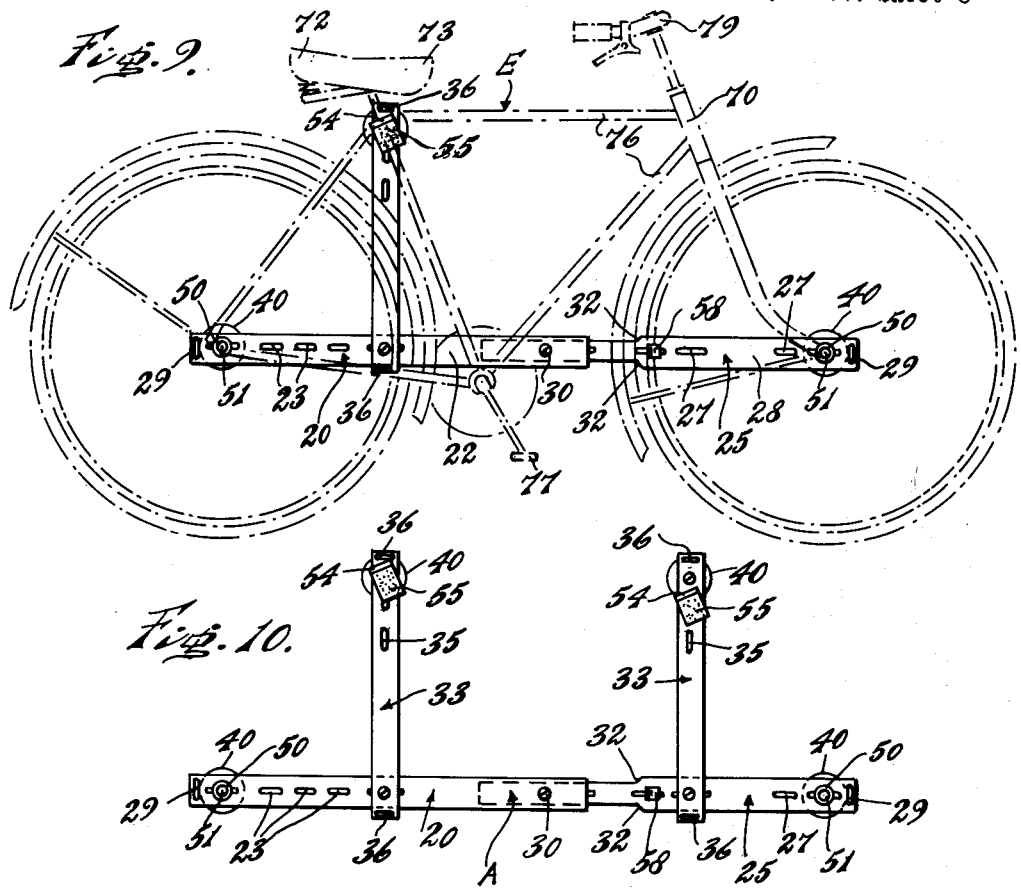
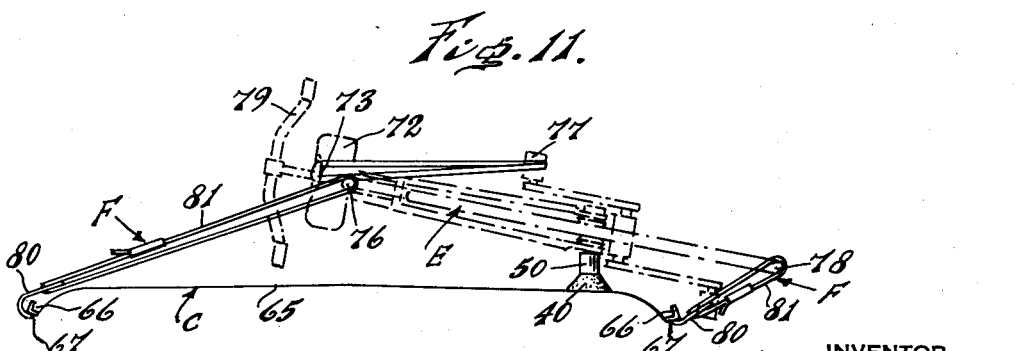
INVENTOR
William L.C. Wheaton
BY Bilker + Moyerman
ATTORNEYS

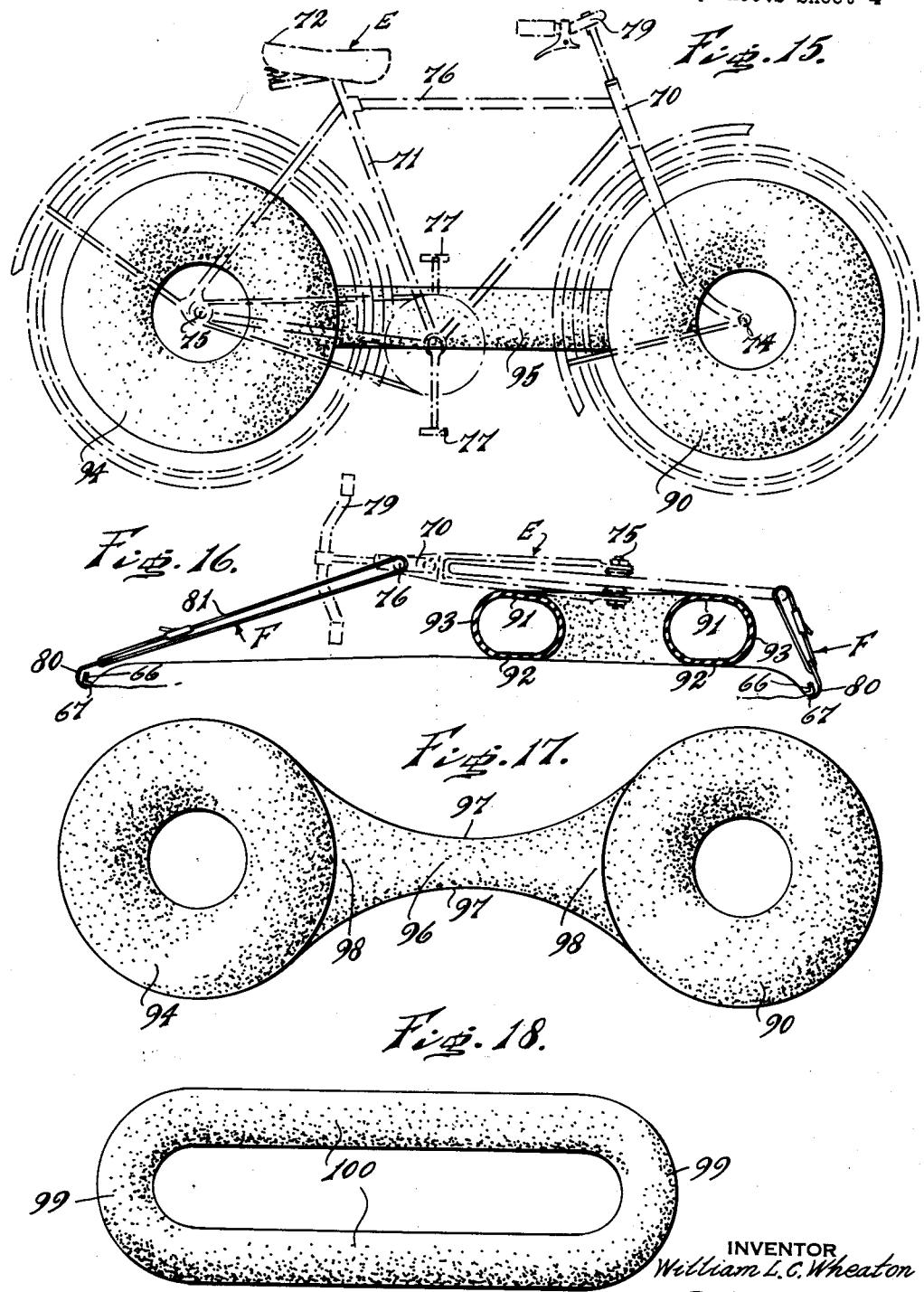

United States Patent Office 3,137,422
Patented June 16, 1964

3,137,422
AUTOMOBILE ROOF MOUNTED BICYCLE
CARRIER
William L. C. Wheaton, Bala-Cynwyd, Pa.
(1300 Summit Road, Berkeley, Calif.)
Filed May 1, 1961, Ser. No. 106,920
8 Claims. (Cl. 224—42.1)

This invention pertains to roof-associated, vehicle attached article carriers. More particularly, it relates to bicycle carriers, for either a single bicycle or a plurality of bicycles, which are adapted to be mounted on the roof of an automotive vehicle and to support bicycles in non-marring spaced-apart relationship thereto.

The problem of transporting a bicycle or a plurality of bicycles from one location to another has plagued bicycle owners for years. Obviously, few of them own trucks or large vehicles which can carry bicycles within their bodies. Even station wagon owners find that carrying a bicycle internally deprived them of cargo and passenger space at a time when it is usually most needed, such as on a family vacation. Furthermore, the increasing popularity of compact cars makes it physically impossible for an increasingly large percentage of car owners to even attempt to carry bicycles internally.

Solutions to the problem have been haphazard at best. On occasion, a portion of the bicycle has been placed in the trunk, the lid tied down and the bicycle allowed to extend rearwardly from the partially open trunk. The dangers and disadvantages of such a procedure, which include a rear projection, an adverse effect on high speed vehicle stability, and a poor distribution of load are obvious. Other solutions involving tying the bicycle to various portions of the automobile are equally dangerous and inconvenient. All of these improvisations involve a multitude of safety hazards and may mar the automotive vehicle and the bicycle too.

Accordingly, it is an object of this invention to provide automobile roof mounted bicycle carriers which have universal application to the roofs of automotive vehicles of many sizes and types.

A further object of the invention is to provide roof top bicycle carriers upon which a bicycle or bicycles can be quickly mounted and dismounted.

Still another object of the invention is to provide a bicycle carrier which will retain a bicycle or bicycles in fixed, spaced-apart, non-marring relationship to the roof of an automobile.

This invention also has an object the provision of roof mounted bicycle carriers which can be used for transporting bicycles atop automotive vehicles without upsetting center of gravity relationships, adversely affecting roadability nor creating safety hazards.

It is also an object of the invention to provide bicycle carriers which utilize portions of the bicycle structure as points for support or suspension such as, for instance, the axles and steering column; the axles; the seat column and axles; and the axles, steering column and seat column.

Also included among the objects of the invention are the provision of resilient, preferably pneumatic or hollow cored, carriers having one surface in juxtaposition to the automobile roof top and another surface in juxtaposition to various portions of the bicycle structure which carriers are apertured to receive the bicycle's axles and/or pedals.

The invention has, as an additional object, the provision of carriers which incorporate an adjustable frame, including longitudinal and transverse members, which is mounted in horizontal spaced-apart relationship to the roof of the automobile and on which are mounted retainers for supporting a bicycle or stacked bicycles at points including axles, steering column and/or seat column.

Other objects of the invention are to provide improved bicycle carriers which may be readily adjusted for bicycles and automobiles of different sizes, which are easily and economically produced, light in weight but strong and sturdy in construction and highly efficient in operation.

These and other related objects of the invention will be apparent to those skilled in the art from a consideration of the description which follows. The various features and details of construction of the invention are more fully set forth herein with reference to the accompanying drawings, wherein like reference numerals designate like parts, and wherein further:

FIG. 1 represents a bottom plan view of a carrier embodying the invention with a bicycle mounted thereon.

FIG. 2 represents a top perspective view of the carrier of FIG. 1.

FIG. 3 represents a fragmentary perspective view of that portion of the carrier shown in FIG. 1 which is in proximity to the top of the bicycle's steering column.

FIG. 4 represents a partial fragmentary sectional detail taken along line 4—4 of FIG. 1.

FIG. 5 represents a partial perspective view of that portion of the carrier shown in FIG. 1 which is in proximity to a wheel of the bicycle (e.g. the rear wheel).

FIG. 6 represents a partial fragmentary sectional detail of a portion of the carrier shown in FIG. 2.

FIG. 7 represents a partial fragmentary sectional detail of a clamping arrangement which is an alternate for the construction shown in FIG. 5.

FIG. 8 is a perspective view of the clamp utilized in the arrangement shown in FIG. 7.

FIG. 9 is a top plan view of another carrier embodying the invention showing a bicycle, in phantom, mounted thereon.

FIG. 10 is a top plan view of still another carrier embodying the invention.

FIG. 11 is a rear view of another embodiment of the invention showing a bicycle, in phantom, carried thereby on the roof of an automotive vehicle.

FIG. 12 represents a top plan view of the carrier shown in FIG. 1 with a bicycle shown in phantom thereon.

FIG. 13 is an elevation showing the carrier of FIG. 1 mounted on the roof of an automobile, as seen from the rear thereof, with a bicycle shown in phantom.

FIG. 14 represents a rear elevational view of the carrier of FIG. 1 modified and employed to carry a plurality of bicycles on the roof of an automotive vehicle.

FIG. 15 represents a top plan view of a bicycle mounted on another carrier embodying the invention.

FIG. 16 represents a rear elevational view, partly in section, showing the carrier on FIG. 15 mounted on the roof of an automotive vehicle with a bicycle shown in phantom thereon.

FIG. 17 represents still another carrier embodying the invention and is a plan view thereof.

FIG. 18 represents a plan view of a carrier embodying the invention and is another embodiment illustrative of many possible modifications.

Referring now to the drawings, it will be observed that the embodiment of the invention shown in FIGS. 1-6 inclusive and 12-14 inclusive comprises a rigid framework A; spacer-support means B for mounting said framework in fixed, spaced-apart relationship to the roof of an automotive vehicle, generally designated as C; various bicycle support means D with which a bicycle, generally designated as E, may be mounted on framework A; and carrier retainer means F for detachably securing framework A to the roof C.

As best shown in FIG. 2, the framework A comprises a rear longitudinal member 20, including strengthening flanges 21, a web 22, a plurality of axial slots 23 which may be of varying length and sizes, and holes 24 and 38. A front longitudinal member 25 is telescopically mounted in member 20 and includes strengthening flanges 26, a plurality of axial slots 27—which may also be of varying dimensions—and a web 28. Members 20 and 25 are also provided with transverse slots 29 at their distal ends which are of use in connection with retainer means F.

A bolt 30 and wing nut 31 may be used, as best shown in FIG. 4, to fix the overall length of telescoped members 20 and 25 by inserting bolt 30 in hole 24, passing it through an appropriate slot 27, and using the nut 31 to secure member 20 to member 25. Other conventional clamping means may obviously be substituted to prevent the telescoping action once the overall length has been adjusted. The respective cross sections of members 20 and 25 are complementary to permit telescoping and member 25 may be provided, if desired, with stops such as shoulders 32 to limit the collapsed telescoped length. Further, those slots 27 which will be most frequently used for adjusting overall length of the frame A may be lengthened to permit a large adjustment without necessitating the removal of bolt 30 from a given slot. If desired, various detents and limits may be provided but it is preferred that framework A be capable of complete disassembly for convenience in transportation of the carrier.

Framework A also includes at least one transverse member such as 33 which, like members 20 and 25, includes strengthening flanges 34, a plurality of axial slots 35, transverse slots 36 at each end thereof and mounting holes 37. Transverse member 33 may be bolted to longitudinal member 25 using mounting hole 37 and one of the slots 27. Other securing means may alternatively be used. It may be positioned longitudinally along 25 as desired.

Other frameworks similar to A will be described henceforth, in connection with other embodiments of the invention, and their construction will not be detailed since it is obvious that they are mere variants of the framework just described and differ only in the number and/or location of transverse members.

Spacer support means, generally designated as B, are provided between the framework A and the roof C. Such spacer supports may generally be described as bumpers, preferably resilient, detachably affixed to the underside of A. One type of spacer support is detailed in FIG. 4 where it is shown on the underside of the end of member 20. As shown, the spacer support includes a rubber or resilient plastic suction cup 40 which is preferably provided with an integral shank 41 which may be either internally threaded or provided with an embedded nut or threaded sleeve 42. A spacer spool 43, which may also be made of resilient, weather-resistant material and which, preferably, has a diameter such that it fits between flanges 21 and abuts the underside of web 22 is also provided. The total assembly may be detachably secured to framework A as with bolt 44. As shown in FIG. 4, the bolt 44 also performs another function in connection with securing support means D. However, this is merely an economical method of construction which is utilized at the spacers mounted on the ends of longitudinal members 20 and 25.

As may be noted in FIG. 3, the spacer support at the end of transverse member 33 is the only fitting at that exact location and, therefore, bolt 44 (not shown in FIG. 3) need perform no other function. The lengths of spools 43 may be identical or may be varied at different locations so as to level the framework. Thus regardless of the slope of the roof, deck, tonneau or the like on which the framework A is mounted, it may be leveled.

While it is possible that suction cups alone may secure the framework A to roof C, it is preferred to use carrier retainer means F, which will be subsequently described, to keep the carrier in position, particularly when loaded on a vehicle moving at high speed. Nonetheless, embodiments placing total reliance upon strong suction cups are intended to be within the scope of the invention. Obviously, where the spacer support means B are merely resilient bumpers, the use of retainer means F is a necessity.

The bicycle support means D are members and structures attached to the top of framework A which serve to secure the bicycle thereto. Several types of devices may be used. FIGS. 4 and 5 illustrate axle cushions, generally designated 50 which are generally cylindrical and include a cored interior 51, a lower face 52 and an upper face 53. As shown in FIG. 4, which is typical of the assembly of axle cushions on frame A, the bottom face 52 is placed in juxtaposition to web 22 and cushion 50 is attached to longitudinal member 20 with the same bolt 44 which is used to attach spacer support B. The head of the bolt 44 is thus at the bottom of the cored interior 51. The interior 51 is shaped to match the perimeter of the bicycle's axle nuts. There are standards for these nuts and surprisingly few varieties are used. The interior 51 may thus be cored for a particular size nut and commercial embodiments of the carrier can be conveniently supplied with a series of cushions 50 so that the carrier may be custom fitted for a particular bicycle or type of bicycle. Alternatively, a single core 51 may be shouldered so as to fit several nuts. Cushions 50 are provided on member 20 for the rear axle nut and on member 25 for the front axle nut.

Support means D also include a steering column bracket 54 which, as shown in FIG. 3, may be U-shaped. The leg of the bracket against which the bicycle will rest should be cushioned or supplied with a resilient bumper 55. The bracket is attached to transverse member 33 (as shown in FIG. 2) with a bolt 56. The bracket 54, shown in FIGS. 2, 3 and 13 is designated as a "long" bracket and it is apparent that the width of its bight will determine the angle which the bicycle frame forms with the horizontal carrier frame A. When a plurality of bicycles are to be stacked, as will be subsequently discussed in connection with FIG. 14, the bracket 54 is modified by decreasing the width of its bight and a "short" bracket 57 utilized. The "short" bracket 57 is also preferred when it is desired to carry a single bicycle in a substantially horizontal position but, as will be explained, this necessitates adjustment of the handle bars.

A final support means D is front wheel clip 58 which is affixed to front longitudinal member 25 as with a bolt 59 and nut 60 (FIG. 6). The clip 58 includes an indented portion 61 adapted to receive the inside rim of the front bicycle wheel and resiliently retain it in a fixed rotational position so that the handle bars cannot move. The clip should be made of resilient material such as, for instance, spring steel.

C generally designates the roof of an automotive vehicle but it is obvious that it may be any flat surface such as the rear deck of a convertible, the tonneau of a car such as a brougham, and the like. Therefore, whenever the term roof is used herein, in the specification and claims, it is intended to encompass such similar structures. As shown in FIGS. 11, 13, 14 and 16, the roof includes a flat portion 65, gutters 66 and undercut gutter portions 67. Obviously the roof itself forms no part of the invention.

The bicycle E may be of any type, foreign or domestic, intended for use by males or females, having hand brakes or coaster brakes, but all of these types include, inter alia, a frame having a forked steering column 70, a seat column 71, a saddle 72 which further includes a horn 73, a front axle 74, a rear axle 75, a plurality of conventional frame members exclusive of those specifically enumerated above which will be generally designated by the numeral 76, pedals 77, front wheel rim 78 and handle bars 79.

Finally, carrier retainer means F are provided for securing frame A and/or portions of the bicycle frame to the roof C. Means F may be of almost infinite variety but preferably include a hook 80 adapted to engage the gutter undercuts 67, a strap 81 which may be conveniently made of a resilient material or include either a resilient portion such as a spring or an adjustable portion such as a buckle, etc. The strap connects the hook 80 with a portion of the frame A such as the transverse slots 29 and 36. Other retaining means which may be employed include lashings or belt 82 (used to secure the steering column 70 to the steering column bracket 54) and belt 83 (used to secure bicycle frame member 76 to longitudinal carrier frame member 20).

In FIGS. 7 and 8 are shown an equivalent of belt 83. This equivalent construction utilizes a generally U-shaped clamp having a bight 84 and legs 85 which are slotted, as at 86, to receive an axle such as 75 at one end and a bolt at the other end. Its use involves some slight adjustment in the relative position of axle cushion 50 and suction cup 40 on frame A. As shown in FIG. 7, axle cushion 50 is attached to member 20 with a bolt 44, the head of which may be located in cored interior 51. This bolt is relatively short and does not (as in the embodiment in FIG. 4) also secure suction cup 40 and spool 43 to the frame; a separate bolt being used for that purpose.

Considering now the use of the carrier shown in FIG. 2 for mounting a single bicycle on the roof of a vehicle, the following steps may be employed. First, the two longitudinal members 20 and 25 are telescopically engaged and loosely secured with bolt 30 and nut 31. Axle cushions 50 are installed at each end of these members as are their companion spools 43 and vacuum cups 40, using bolt 44. The axle cushions are positioned as closely as possible to accommodate the length of the bicycle to be carried. Final adjustment for length of the bicycle (and this length, of course, should be measured with the front wheel straight) is made by varying the amount of telescoping action between 20 and 25. Thereafter, transverse member 33 is loosely attached to member 25 and bracket 54, in turn, is loosely attached to 33.

At this point, the bicycle is placed horizontally on the ground, chain side down, with the front wheel held straight. The frame is then placed atop the bicycle with the axle cushions 50 aligned so that the front and rear axle nuts enter and are retained within the cored interiors 51. Shaftlike portions of bicycles having gear shifts may also protrude through holes such as 38 and with such bicycles holes 38 also constitute bicycle support means. Member 33 and bracket 54 are then positioned so that the steering column 70 will rest squarely on the cushioned portion of the bracket. As shown in FIG. 13, the height of the bracket 54 will determine the angle which the bicycle will assume with respect to the frame. The front wheel clip 58 is then mounted on member 25 so that its indented portion 61 receives and resiliently retains rim 78. Finally, a third suction cup 40 and spacer 43 are attached to the underside of the transverse member 33 in the vicinity of bracket 54 to provide at least three spacer support points B. All fastening means may now be completely tightened. Obviously these initial adjustment and assemblies need only be made once to suit the carrier for use with a particular bicycle.

After the bicycle is in position on the frame, which is now assembled, it is secured thereto using lashings 82 (to secure the steering column 70 to the bracket 54) and the straps 83 (to secure the frame members 76 adjacent the axles to the longitudinal members 20 and 25).

As previously mentioned in connection with FIGS. 7 and 8, the clamp shown therein may be used to secure members 76 to the frame A instead of utilizing straps 83. A long rubber band or strap may then preferably be slipped over the top bicycle pedal 77 and the saddle horn 73 (as shown in FIG. 11) in order to keep the pedal fixed and to keep it from revolving when atop the car. This expedient may be used with other embodiments of the invention as well. Hand brake levers of English type bicycles should be twisted in toward the center of the bicycles at this time.

The carrier with the bicycle on it should now be lifted onto the roof of the car. It will assume the position shown in FIG. 13 and should be positioned transversely so that the lower pedal overhangs the roof by several inches at a point where there is no interference with the door swing. When the frame has been positioned it is pressed down to cause the suction cups to adhere and, thereafter the frame A is secured to the roof C. After the frame has been positioned and set on the roof subsequent demounting and mounting of the bicycle do not require its removal. In FIG. 13 one strap 81 is shown connecting a frame member 76 with undercut gutter portion 67. Another strap 81 connects slot 36 with the gutter on the other side. Obviously other points of attachment on the frame (e.g. slots 29, 36 or 23) or bicycle may be utilized with equal effect as in FIG. 14.

Consideration should now be given to FIG. 14, which illustrates the use of the carrier shown, inter alia, in FIGS. 1, 2, 12 and 13 to carry a plurality of bicycles. FIG. 14, specifically, shows the carrier used to carry two bicycles. One carrier is utilized for each bicycle. The lower carrier A is identical to that shown in FIG. 2 and the previous discussion applies. However, the short steering column bracket 57 is employed thus making the bicycle which is mounted on the carrier more nearly horizontal. Straps 81 secure the lower frame to the roof. A second frame of the same type is provided intermediate the two bicycles. From this frame are removed all suction cups 40 and spools 43 (if desired these may be mounted as additional spacer supports beneath the lower frame utilizing appropriate slots). The two suction cups which were in alignment with top axle cushions 50 are replaced by additional axle cushions 50 which are positioned to receive and retain the axle nuts of the lower or underlying bicycle. Thus top frame A has axle cushions on its top and bottom. An additional steering column bracket 57 is provided underneath the top frame and is positioned so as to juxtapose the steering column of the lower bicycle. Mounting is simple and may be performed as follows. The lower bicycle is placed atop the lower carrier and mounted on roof C as previously described in connection with FIG. 13 except that strapping of column 70 to bracket 57 is postponed. It is also required that handle bars 79 be turned approximately 90° with respect to steering column 70 in order that they not hit the roof. The upper or overlying bicycle is mounted atop the upper carrier in the conventional manner. The upper carrier is then placed atop the lower bicycle so that the underside axle cushions 50 engage the axle nuts of the lower bicycle and so that the underside bracket 37 abuts steering column 70 of the lower bicycle. Thus the upper frame is provided with at least three spacer support points (i.e. two axle cushions and one bracket). Obviously additional auxiliary spacer means may be used between the bicycles. The assembly is secured by strapping the two cushioned brackets 57 to either side of the lower steering column 70 with strap 82 and by, similarly, strapping the upper column to the top bracket 57. Auxiliary or additional means may be used for strapping the carriers to the roof and to each other. Hole 38 (see FIG. 2) serves to receive the axle of gear-type bicycles when the lower bicycle in a stack of two or more is of this type.

The embodiments of my inventions shown in FIGS. 9 and 10 are employed in a manner similar to the previous embodiments. However, in FIG. 9, the transverse member 33 is attached to rear longituidnal member 29 so that it serves to support seat column 71. Support is achieved with column bracket 54 which is also provided with a bumper 55.

In FIG. 11 is shown an embodiment of the invention which dispenses with the rigid framework A and yet, like the previous embodiments, utilizes the bicycle axles as points of support. The carrier comprises two spacer supports including suction cups 40 and axle cushions 50 which may be cocked or canted. The assembly is similar to that detailed in FIG. 4 and the spool 43 may be eliminated if desired. The bicycle frame itself is fully utilized and a long strap 81 attaches a frame member 76 to one side of the roof while a short strap 81 attaches a wheel rim (e.g. front wheel rim 78) to the other side of the roof. A member like 25 may be hard to hold the front wheel in a rigid position. A long rubber band or strap is slipped over the top bicycle pedal 77 and the horn of saddle 72 to keep it from hitting the roof. This type of carrier allows for extremely quick mounting. It, like the previous embodiments, lends itself to stacking of bicycles analogous to the arrangement in FIG. 14, with the provision of auxiliary spacers.

In FIGS. 15–18 are shown other embodiments of the invention. While these devices may be used as the resilient spacer support means B between frame A and roof C, they are also capable of independent use as rooftop carriers and in such use are part of my broad invention in roof top bicycle carriers which permit mounting of a bicycle atop a car roof in fixed, spaced-apart, non-marring relationship thereto.

All of the embodiments shown in FIGS. 15–18 are intended to be of resilient construction and materials of construction may include resilient foam plastics (e.g. polystyrene, isocyanate polymers and copolymers, etc.), rubber and rubberlike solids, and hydrocarbons derivatives. The carriers may be solid throughout, inflatable or of a type having a cored interior (e.g. see FIG. 16).

The carrier shown in FIGS. 15 and 16 is shaped generally, in plan, like a dumbbell and includes what may be arbitrarily designated a front ring 90 having flattened top and bottom faces, respectively 91 and 92, and arcuate side walls 93. A rear ring 94 is similarly constructed. An intermediate transverse cross piece 95 joins rings 90 and 94. Cross piece 95 may also be provided with flat top and bottom surfaces. The carrier is designed to accommodate bicycles of various sizes and consequently the core of ring 90 is adapted to receive front axle 74 and the core of ring 94 to receive rear axle 75 and to thus position the bicycle axles in fixed spaced relationship to the roof. The wheels of the bicycle rest on the surfaces 91 of rings 90 and 94 and are supported thereby. Finally, cross piece 95 serves as a stop for pedals 77 limiting their motion and serving as a bumper for them. The entire assembly of carrier and bicycle is secured to the roof, for instance, as shown in FIG. 16 by use of a long strap 81 and a short strap 81. The height of rings 90 and 94 is such that the handle bars 79 clear surface 65, a height above about 8″ being usually sufficient. The bicycle may also be strapped to the carrier and the carrier, in turn, may be strapped to the roof in any conventional manner.

FIG. 17 shows a similar embodiment which also includes rings 90 and 94. However, the cross piece 96 is provided with arcuate sides 97 and flared ends 98.

Another embodiment, generally oval in configuration, is shown in FIG. 17 and includes arcuate ends 99 and straight side portions 100. The bicycle axles and the pedals are adapted to be received within the core of this embodiment.

Although the invention has been described in considerable detail, such description is intended to be illustrative rather than limiting, since the invention may be variously embodied and its extent, consequently, is to be determined by the appended claims.

Having described my invention, I claim:

1. A roof associated bicycle carrier for supporting a bicycle in horizontal parallel planar relationship to a vehicle roof comprising a rigid framework including a first longitudinal member and a second longitudinal member extendably attached thereto and in longitudinal alignment therewith; at least one transverse member adjustably attached proximate one end thereof to a longitudinal member; resilient spacer supports adjustably attached beneath said rigid framework for mounting said framework in fixed, spaced apart relationship to a roof; bicycle supports adjustably mounted on said rigid framework including apertured axle cushions located proximate the spaced apart ends of said first and second longitudinal members, and a bracket proximate the unattached end of each transverse member, said axle cushions being adapted to receive and provide subjacent co-axial support for the axes of a bicycle and said bracket being adapted to receive and support a bicycle frame member; means for retaining a bicycle on said bicycle supports; and means for retaining said framework on a roof.

2. A roof associated bicycle carrier for supporting a bicycle in horizontal parallel planar relationship to a vehicle roof comprising a rigid framework including a first longitudinal member and a second longitudinal member extendably attached thereto and in longitudinal alignment therewith, at least one transverse member adjustably attached proximate one end thereof to a longitudinal member; spacer supports adjustably attached beneath said rigid framework for mounting said framework in fixed, spaced apart relationship upon an underlying bicycle including cored axle cushions located proximate the spaced apart ends of said first and second longitudinal member to receive the axles of the underlying bicycle, and a bracket proximate the unattached end of each transverse member to receive a bicycle frame member; overlying bicycle supports adjustably mounted on said rigid framework including apertured axle cushions located proximate the spaced apart ends of said first and second longitudinal members, and a bracket proximate the unattached end of each transverse member, said axle cushions being adapted to receive and provide subjacent co-axial support for the axles of a bicycle and said bracket being adapted to receive and support a bicycle frame member; means for retaining an overlying bicycle on said bicycle supports and means for retaining said framework on an underlying bicycle.

3. A roof associated bicycle carrier for supporting a bicycle in horizontal parallel planar relationship to a vehicle roof comprising a rigid framework including a front longitudinal member and a rear longitudinal member in adjustable telescopic engagement, and a transverse member adjustably attached at one end thereof to said front longitudinal member, said members having slots therein; spacer supports comprising vertically aligned assemblies of suction cups and spacer spools affixed to the underside of said framework at the free ends of each of said framework members; bicycle supports adjustably affixed to the top of said framework including cored axle cushions at the remote ends of said longitudinal members and a cushioned adjustable steering column bracket proximate the remote end of said transverse member adapted, respectively, to provide subjacent co-axial support for the axles and to support the steering column of a bicycle; a resilient clip adjustably mounted on said front longitudinal member to receive the rim of the front wheel of a bicycle and prevent it from pivoting; straps for retaining said framework on a roof, said straps passing through said slots in said framework members; and straps for retaining a bicycle on said bicycle supports.

4. A roof associated bicycle carrier for supporting a bicycle in horizontal parallel planar relationship to a vehicle roof comprising a rigid framework including a front longitudinal and a rear longitudinal member in adjustable telescopic engagement, and a transverse member adjustably attached at one end thereof to said front longitudinal member; spacer supports comprising assemblies of suction cups and spacer spools affixed to the underside of said framework proximate the free ends of each of said framework members; bicycle supports adjustably affixed to the top of said framework including adjustable cored axle cushions at the remote ends of said longitudinal members and an adjustable steering column bracket proximate the remote end of said transverse member adapted, respectively, to provide subjacent co-axial support for the axles and to support the steering column of a bicycle; a resilient clip adjustably mounted on said front longitudinal member to receive the rim of the front wheel of a bicycle and prevent it from pivoting; means for retaining said carrier on a roof; and means for retaining a bicycle on said bicycle supports.

5. A roof associated bicycle carrier for supporting a bicycle in horizontal parallel planar relationship to a vehicle roof comprising a rigid framework including a front longitudinal member and a rear longitudinal member in adjustable telescopic engagement, and a transverse member adjustably attached at one end thereof to said front longitudinal member; resilient spacer supports affixed to the underside of said carrier at the free ends of each of said framework members; bicycle supports adjustably affixed to the top of said framework, including adjustable cored axle cushions at the remote ends of said longitudinal members, and an adjustable steering column bracket proximate the remote end of said transverse member adapted, respectively, to provide subjacent co-axial support for the axles and to support the steering column of a bicycle; means for retaining said carrier on a roof; and means for retaining a bicycle on said bicycle supports.

6. A roof associated bicycle carrier for supporting a bicycle in horizontal parallel planar relationship to a vehicle roof comprising a rigid framework including longitudinal members and a transverse member attached thereto, said framework being adjustable to suit the length and height of a bicycle; spacer supports comprising vertically aligned assemblies of suction cup and spacer spool mounted on the underside of said framework; bicycle support means mounted at the distal ends of said longitudinal members apertured to receive the axles of a bicycle and to provide subjacent co-axial support therefor; additional bicycle support means mounted on said transverse member remote from said longitudinal members to support a portion of a bicycle frame; means for retaining a bicycle on said bicycle support means and means for retaining said carrier on a roof.

7. A roof associated bicycle carrier for supporting a bicycle in horizontal parallel planar relationship to a vehicle roof comprising a rigid framework including a front longitudinal member and a rear longitudinal member in adjustable telescopic engagement, and a transverse member adjustably attached proximate one end thereof to said rear longitudinal member; resilient spacer supports affixed to the underside of said carrier proximate the unattached ends of each of said framework members; bicycle supports adjustably affixed to the top of said framework including cored axle cushions at the remote ends of said longitudinal members and an adjustable seat column bracket proximate the remote end of said transverse member adapted, respectively, to provide subjacent co-axial support for the axles and to support the seat column of a bicycle; means for retaining said framework on a roof; and means for retaining a bicycle on said bicycle supports.

8. A roof associated bicycle carrier for supporting a bicycle in horizontal parallel planar relationship to a vehicle roof comprising a rigid framework including a front longitudinal member, a rear longitudinal member in adjustable telescopic engagement therewith, a front transverse member adjustably attached proximate one end thereof to said front longitudinal member, and a rear transverse member adjustably attached proximate one end thereof to said rear longitudinal member; resilient spacer supports affixed to the underside of said framework proximate the unattached ends of each of its member; bicycle supports adjustably affixed to the top of said framework including cored axle cushions proximate the remote ends of said longitudinal members to receive and provide subjacent co-axial support for the axles of a bicycle, a bracket proximate the unattached end of said front transverse member to receive the steering column of a bicycle and a bracket proximate the unattached end of said rear transverse member to receive the seat column of a bicycle; means for retaining said framework on a roof; and means for retaining a bicycle on said bicycle supports.

References Cited in the file of this patent
UNITED STATES PATENTS

| | | |
|---|---|---|
| 593,105 | Kingsbury | Nov. 2, 1897 |
| 2,596,860 | McCrory et al. | May 13, 1952 |